United States Patent
Park et al.

(10) Patent No.: US 9,170,792 B2
(45) Date of Patent: Oct. 27, 2015

(54) DYNAMIC OPTIMIZATION OF PIPELINED SOFTWARE

(71) Applicant: Intel Corporation, Santa Clara, CA (US)

(72) Inventors: Hyunchul Park, Santa Clara, CA (US); Hongbo Rong, San Jose, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,463

(22) PCT Filed: May 30, 2013

(86) PCT No.: PCT/US2013/043296
§ 371 (c)(1),
(2) Date: Dec. 16, 2013

(87) PCT Pub. No.: WO2014/193381
PCT Pub. Date: Dec. 4, 2014

(65) Prior Publication Data
US 2014/0359591 A1 Dec. 4, 2014

(51) Int. Cl.
*G06F 9/45* (2006.01)
(52) U.S. Cl.
CPC .............. *G06F 8/4452* (2013.01); *G06F 8/443* (2013.01)

(58) Field of Classification Search
CPC ................................ G06F 8/4452; G06F 8/443
USPC .................................................. 717/150–153
See application file for complete search history.

(56) References Cited

U.S. PATENT DOCUMENTS

| 6,016,399 | A | * | 1/2000 | Chang ............................ 717/160 |
| 6,115,811 | A | * | 9/2000 | Steele, Jr. ....................... 712/244 |
| 2003/0154469 | A1 | | 8/2003 | Anderson et al. |
| 2009/0125574 | A1 | | 5/2009 | Mejdrich et al. |
| 2013/0007385 | A1 | * | 1/2013 | Das et al. ....................... 711/154 |

FOREIGN PATENT DOCUMENTS

EP 0490524 6/1992

OTHER PUBLICATIONS

International Search Report and Written Opinion International Application No. PCT/US2013/043296 mailed Feb. 28, 2014.

* cited by examiner

*Primary Examiner* — Anna Deng
(74) *Attorney, Agent, or Firm* — Trop, Pruner & Hu, P.C.

(57) ABSTRACT

In an embodiment, a system includes a processor including at least one core to execute operations of a loop that includes S stages. The system also includes stage insertion means for adding a delay stage to the loop to increase a lifetime of a corresponding register associated with a first variable of the loop and to delay storage of contents of the register. The system also includes a dynamic random access memory (DRAM). Other embodiments are described and claimed.

17 Claims, 6 Drawing Sheets

DYNAMIC OPTIMIZATION OF PIPELINED SOFTWARE

TECHNICAL FIELD

Embodiments relate to pipelined software.

BACKGROUND

Software pipelining is a compiler technique that can increase throughput of a computationally-intensive loop by overlapping execution of multiple iterations of the loop. In overlapped multiple iterations, some iterations may be speculative due to a reversal of order of operations, e.g., the order of execution of the operations may differ from an execution order indicated in the loop. An exception that occurs during a speculative iteration can invalidate the result of the iteration. One technique to correct the invalid result is to discard all previous results of the loop iterations and start the loop calculation again ("roll-back"), which can be costly in terms of computational resources and time.

DETAILED DESCRIPTION

Apparatus and methods are presented herein to address roll-back overhead in dynamic optimization with atomic execution support. In embodiments of the invention, a code generation technique is presented that can reduce roll-back overhead in dynamic binary optimization of software pipelined loops.

An atomic region may specify a region of code where aggressive speculations (both data and control) are performed, and updates may be committed at the end of the region. Since the atomic region limits the optimization scope, it may be important to increase an atomic region size. However, the larger atomic region size has a downside of increased roll-back overhead, e.g., when any unexpected behavior (e.g., speculation failure exceptions, side exits, memory faults) is detected, any progress made within a region may be discarded, the execution may be rolled back to the beginning of the region, and the loop may be repeated with less aggressive optimizations.

In response to unexpected behavior (e.g., exception, fault, speculation failure, side exit), embodiments of the present invention enable recovery of a last non-speculative iteration's results and commit iterations since a previous commit. This may be accomplished by keeping an extra copy of "live-out" values for the previous iteration, and delaying store operations to keep contents of a memory intact and undisturbed by the speculative iterations.

Figure 1:
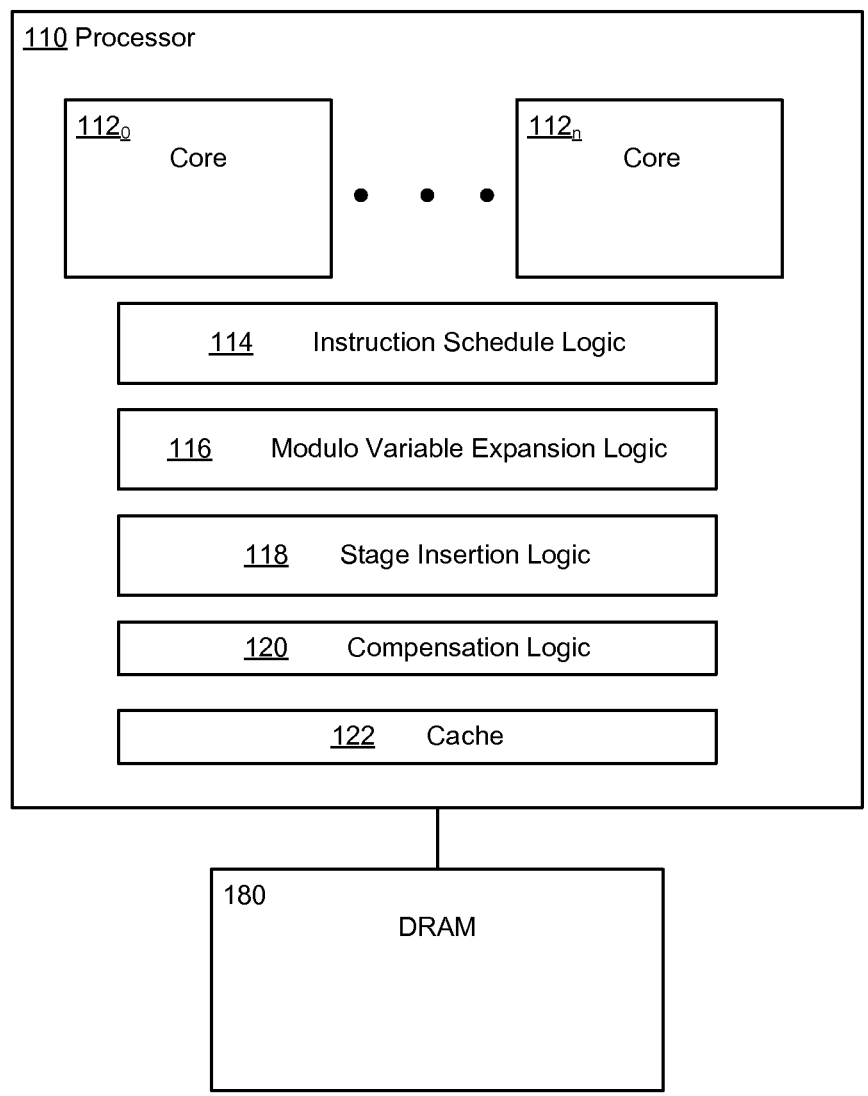
FIG. 1 is a block diagram of a system to optimize execution of a loop, according to an embodiment of the invention.

FIG. 1 is a block diagram of a system 100 to optimize execution of a loop, according to an embodiment of the invention. The system 100 includes a processor 110 coupled to a dynamic random access memory (DRAM) 180. The processor 110 may include one or more cores $112_0, 112_1 \ldots 112_n$ to execute instructions. The processor 110 may also include instruction schedule logic 114, modulo variable expansion logic 116, stage insertion logic 118, compensation logic 120, and one or more cache memories including cache 122. The instruction schedule logic 114, modulo variable expansion logic 116, stage insertion logic 118, and compensation logic 120 may be implemented in software, firmware, hardware, or a combination thereof.

In operation, a loop that includes a plurality of operations may execute on one of the cores, such as the core $112_0$. The instruction schedule logic 114 may schedule iterations of the loop according to a pipelined schedule. In some embodiments, one or more of the operations of a first iteration may be scheduled to execute after (e.g., later than) one or more of the operations in a second or later iteration are scheduled to execute. The modulo variable expansion logic 116 may rename a register name of a register (e.g., employ use of a replacement register $X_i$ instead of a register X) that is assigned a value of a variable X of the loop in order to reduce dependences of one or more operations of the first iteration on one or more operations of a later iteration.

A loop executes for a number of iterations, and each iteration typically includes a number of stages. Each stage of an iteration includes a number of cycles ("iteration interval" (II)) between a start of the iteration and a start of an immediately subsequent iteration. The stage insertion logic 118 may insert a stage into each iteration of the loop prior to execution at runtime to extend a lifetime (e.g., time during which the register is relied upon to contain an assigned value) of the register that has been renamed and to delay storage of the contents of the renamed register. The compensation logic 120 may finish execution of any delayed stores that have not executed and return a final value to the register X after the loop is complete.

Figure 2:
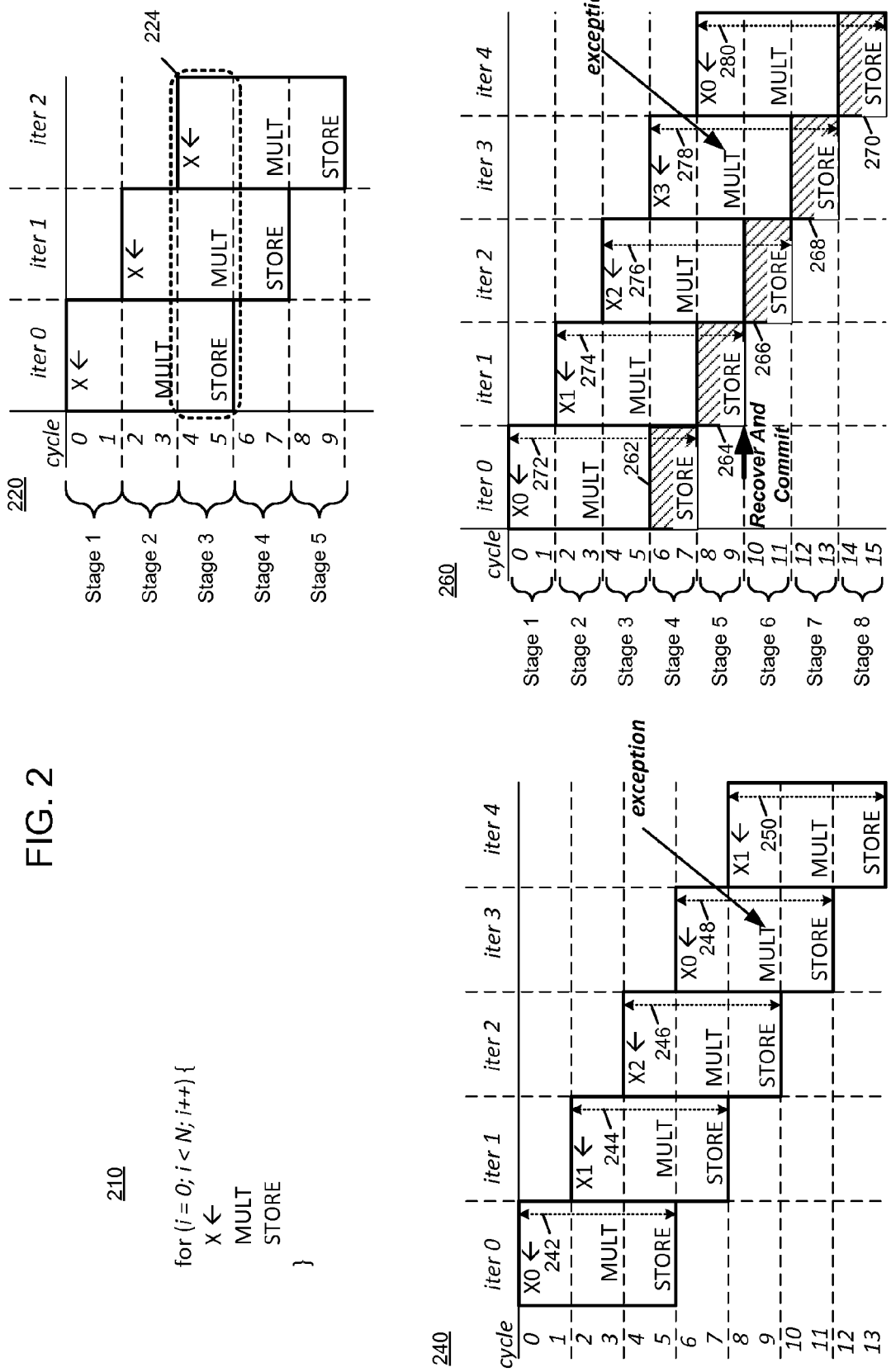
FIG. 2 is an optimization scheme for a pipeline scheduled loop, according to an embodiment of the invention.

FIG. 2 shows an optimization scheme for a pipeline scheduled loop, according to an embodiment of the invention. As an exemplary loop, pseudocode loop 210 includes an assign operation (X←) to assign a value into register X, followed by a multiplication (mult) operation, which is followed by a store operation that stores a value determined in the iteration (e.g., the value in register X, or another value) into a memory location of a memory, e.g., the DRAM 180 of FIG. 1.

Software pipelined schedule 220 is a representation of execution of three iterations of the loop 210 according to a pipelined schedule that may be determined by a software schedule logic such as the instruction schedule logic 114 of FIG. 1. The iterations 0, 1, 2 are separated with regard to initiation of each iteration, by an iteration interval (also initiation interval (II) of two cycles. Each iteration may be divided into stages, and each stage may include II cycles. For example, in the pipelined schedule 220 each iteration includes three stages, e.g., iteration 0 includes stages 1-3 (cycles 0-5). The schedule may reach a steady state that repeats. The steady state may be represented by a kernel 224 that includes each of the operations of one iteration. The kernel repeats every II cycles, as shown in dotted box 224.

Iterations 1 and 2 may be pipeline scheduled in order to take advantage of computational resources that may be available, and so the iterations 0, 1, and 2 may be executed in parallel. For example, if iteration 0 is in execution, iterations 1 and 2 may be considered to be "speculative" because they are to be executed while iteration 0 is being executed, and so they may or may not be accurate iterations of the loop 210 due to dependences on iteration variables that may change during execution of iteration 0. For example, if the value stored in register X in cycle 0 changes in cycle 3 of iteration 0, the value in register X at cycle 2 (iteration 1) will not agree with the value of X at the end of iteration 0, and therefore any calculations within iteration 1 may be incorrect and may be discarded, e.g., rolled back to iteration 0. Use of a common register for X may create unwanted dependences in speculative iterations of the loop 210.

Since multiple iterations run in parallel, a "lifetime" of register X, e.g., range of cycles/stages in which register X maintains an assigned value that may be relied upon) in a particular iteration can overlap with one or more lifetimes of register X in other iterations. To avoid dependences between iterations that overlap in execution, the register X may be "renamed," e.g., assigned to a replacement register with a different name in each iteration, as shown in schedule 240. Each lifetime spans three iterations, and so three distinct instances of the lifetime of X are used: X0, X1, and X2. The lifetime of Xi in each iteration is shown, e.g., lifetime 242 of X0 (iteration 0), lifetime 244 of X1 (iteration 1), lifetime 246 of X2 (iteration 2), lifetime 248 of X0 (iteration 3), and lifetime 250 of X1 (iteration 4).

In the example shown in pipelined schedule 240, the loop conditionally commits (e.g., commit subject to a condition) once every 3 iterations. As indicated in schedule 240, an exception (e.g., overflow exception) occurs in iteration 3, cycle 9 prior to a commit point, e.g., a commit at the end of cycle 9. Embodiments of the present invention aim to reduce discarded work by avoiding a full-scale roll-back when unexpected behaviors occur in pipelined loops.

In general, a problem associated with pipeline scheduling can be formulated as below.
S: total number of stages in a single iteration
E: unexpected behavior that requires roll-back in atomic region, such as exceptions, memory faults, speculation failures, and side exits
N: iteration count in which E occurs (starting from 0)
M: stage number within an iteration in which E occurs (starting from 0)
When E occurs in (iteration=N, stage=M), iteration (N−S+M) has finished. It would be desirable to recover the state at the finish of iteration (N−S+M) and make a commit. The event E can be handled and the execution of the loop can be resumed starting from iteration (N−S+M+1).

When unexpected behaviors happen during the execution of software pipelined loops, generated code may be able to recover the most recently finished iteration so that a commit point can be identified. To achieve this recovery, two machine states are to be recovered: the register state (X0, X1, X2) and the memory state (STORE).

Recover the Register State.

The registers that are live across the "loop back edge" and "live-out registers" are of interest. A value assigned to a register may be considered "live" if there is an instruction to be executed that awaits the value, and therefore the value is maintained in the register and is available to the instruction to be executed. A "loop back edge" refers to an end point of a loop iteration, which is also a start point of a next iteration of the loop. A register value Q that is "live across the loop back edge" refers to a value assigned to a register (e.g., register R) that is live across successive iterations, e.g., a next iteration consumes the value Q stored in register R after a first iteration is complete. A "live-out register" refers to a register assigned a value that is consumed by an operation outside of the loop after the loop completes. All other registers (e.g., registers not assigned values that are either "live-out" or "live across the loop back edge") can be re-initialized when the loop resumes execution after the commit is completed. For these "live-out registers" and/or "live across the loop back edge registers", the values from the previously finished iteration (e.g. iteration 1 in schedule 240, completed before currently executing iteration 2) are to be kept alive when the exception occurs, e.g., cycle 8-9. Values from the previous iteration (e.g., iteration 1) may be kept alive by extending the live range of each live-out register by a stage (e.g., two cycles) in each iteration and renaming each of the X registers (e.g., replacing each of the X registers by an independent register with a corresponding name).

Extended lifetimes (272, 274, 276, 278, and 280) of live-out and renamed registers are shown schedule 260. By extending the lifetime 244 (e.g., with an additional stage 264 to lifetime 274, the value of X1 will be still available in cycle 8-9. Note that the register for X of iteration 3 has been renamed to X3 in schedule 260, which permits the value of X1 from iteration 1 to be maintained until the end of cycle 9, so that in the event of an exception associated with the multiply operation in iteration 3 (cycle 9), the register state of iteration 1 can be recovered by using the value assigned to X1.

Recover the memory state Since store operations have final impact on the memory (e.g., not recoverable unless the entire atomic region is rolled back), all store operations performed during the current kernel should come from the non-speculative iteration (e.g., the latest iteration that has finished when the current kernel executes), rather than from a speculative iteration. The pipeline scheduler keeps all the stores in the last stage of the schedule, e.g., the pipeline scheduler does not speculate stores. Therefore, it can be assumed that all the stores are scheduled in the last stage of an iteration. When the current kernel (cycle 8-9 in 240) executes, the store operation is coming from iteration 2 and it is a speculative iteration since it has not finished. The latest finished iteration is iteration 1 and is non-speculative. Therefore, stores may be delayed by adding one stage (e.g., 262, 264, 266, 268, 270) to each iteration, as shown in schedule 260. With the added stage, all the stores performed in the current stage (e.g., stage 5) are from the non-speculative iteration. In the current kernel (cycle 8-9), iteration 1 finished correctly, except for the store operation. If unexpected behavior (e.g., exception) occurs, the store operations can be re-executed to finish iteration 1. To generalize, an exception at stage M in iteration N may be trigger a recovery and commit of results of iteration (N−S+M). (In the event that the store operation in iteration 1 causes a memory fault, there can be no recovery of the result of iteration 1 and roll-back to the last commit point iteration 0 and execution resumes from iteration 0).

Extended stage insertion The combination of Recover the register state (above) and Recover the memory state (above) can work by insertion of an extended stage (e.g., stages 262, 264, 266, 268, 270) at the end of each iteration schedule for live-out registers and store operations. When roll-back is to occur, the execution of the extended stage for the non-speculative iteration is completed.

Runtime Support

Runtime code that handles memory faults and exceptions may support the code generation technique described herein. When an exception occurs, an exception handler can be executed to handle the exception. After execution of the exception handler, a compensation code block that recovers the state of the last non-speculative iteration may be executed. This compensation code block can include execution of the extended stage (e.g., 264) in schedule 260, and can also include recovery of the original live-out register values, e.g., X0, X1, X2, X3, all of which are live in cycle 9. In the example 260, execution of the compensation code block includes copy of contents of register X3 to register X, since the renamed registers X0-X3 are internal to the pipelined loop. The compensation code block may be different for each iteration, and execution of each compensation code block may copy contents of one of the register values X0, X1, X2, X3, to register X. (For example, for an exception that occurs in cycle 9 as in FIG. 2, the compensation block for iteration 1 may be executed, which copies X1 to X.) After execution of the compensation block, a commit may be performed to save results of a previously complete iteration, (e.g., iteration 1 in schedule 260).

Figure 3:
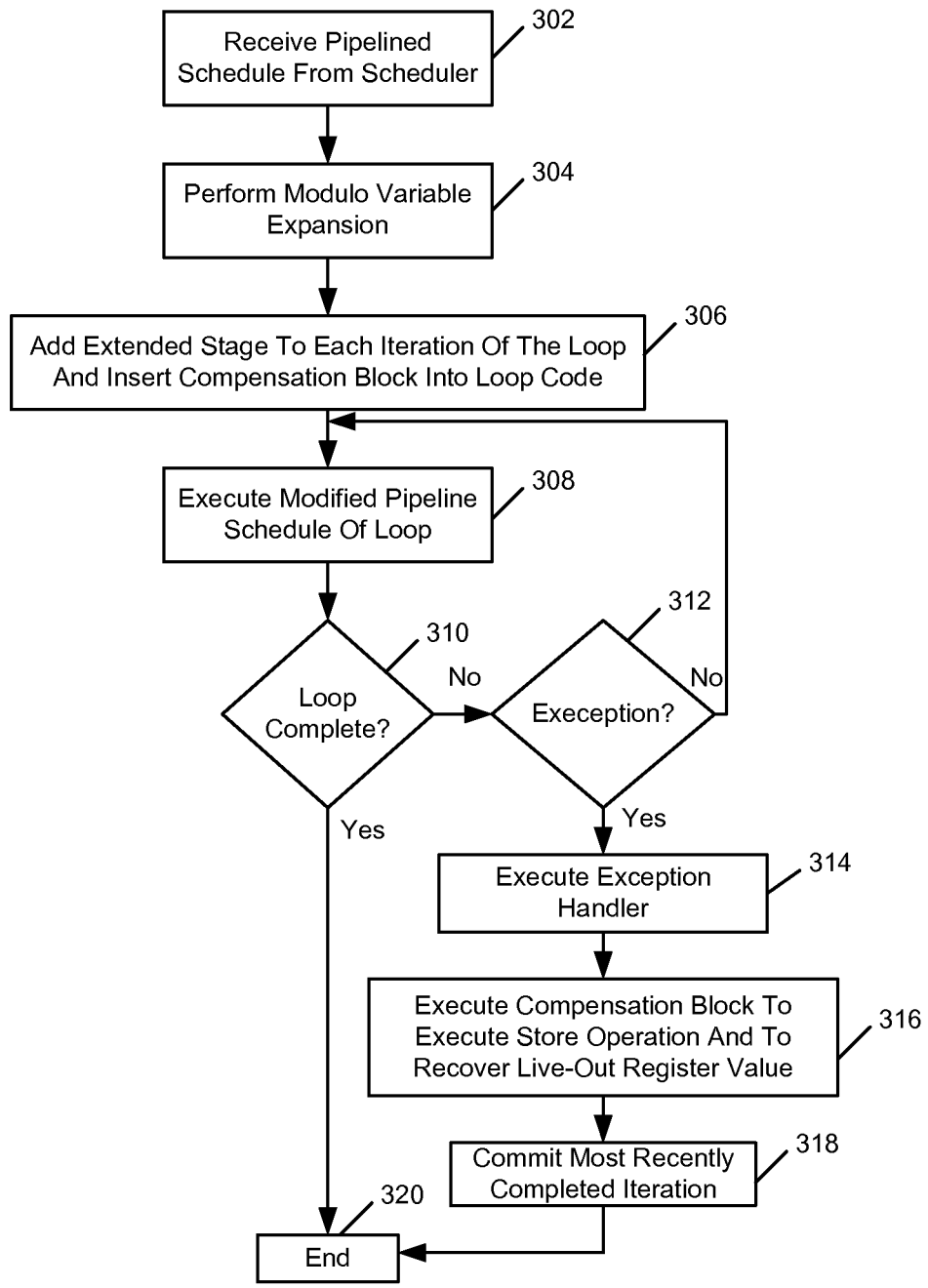
FIG. 3 is a flow diagram of a method of optimizing execution of a pipeline scheduled loop, according to an embodiment of the invention.

FIG. 3 is a flow diagram of a method of scheduling operations of a loop, according to one or more embodiments of the present invention. At block 302, a pipelined schedule of the loop is received from a pipeline scheduler at compile time. Continuing to block 304, modulo variable expansion is performed at compile time, e.g., renaming of a register (e.g., X) to one of several registers that are to be assigned cyclically (e.g., X0, X1, X2, X3, in 260 of FIG. 2). Advancing to block 306, an additional stage may be added at compile time, e.g., including one or more "no-ops" in each iteration of the pipelined schedule of the loop to form a modified pipelined schedule of the loop in which store(s) may be delayed and shifted to the additional stage, and compensation code ("compensation block") is added into the loop code. Moving to block 308, the modified pipelined schedule of the loop may be executed at runtime. Proceeding to decision diamond 310, if execution of the loop is complete (e.g., no exceptions), the method ends at 320. If the execution of the loop is not complete, continuing to decision diamond 312, if no exception is detected, execution of the modified pipelined schedule continues at block 308. If an exception occurs, proceeding to block 314, an exception handler is executed at runtime responsive to the exception. Advancing to block 316, the compensation block of code may be executed at runtime to finish execution of any delayed stores that have not executed and to return a final value to the register X. Continuing to block 318, the most recent completed iteration is committed. The method ends at 320.

Figure 4:
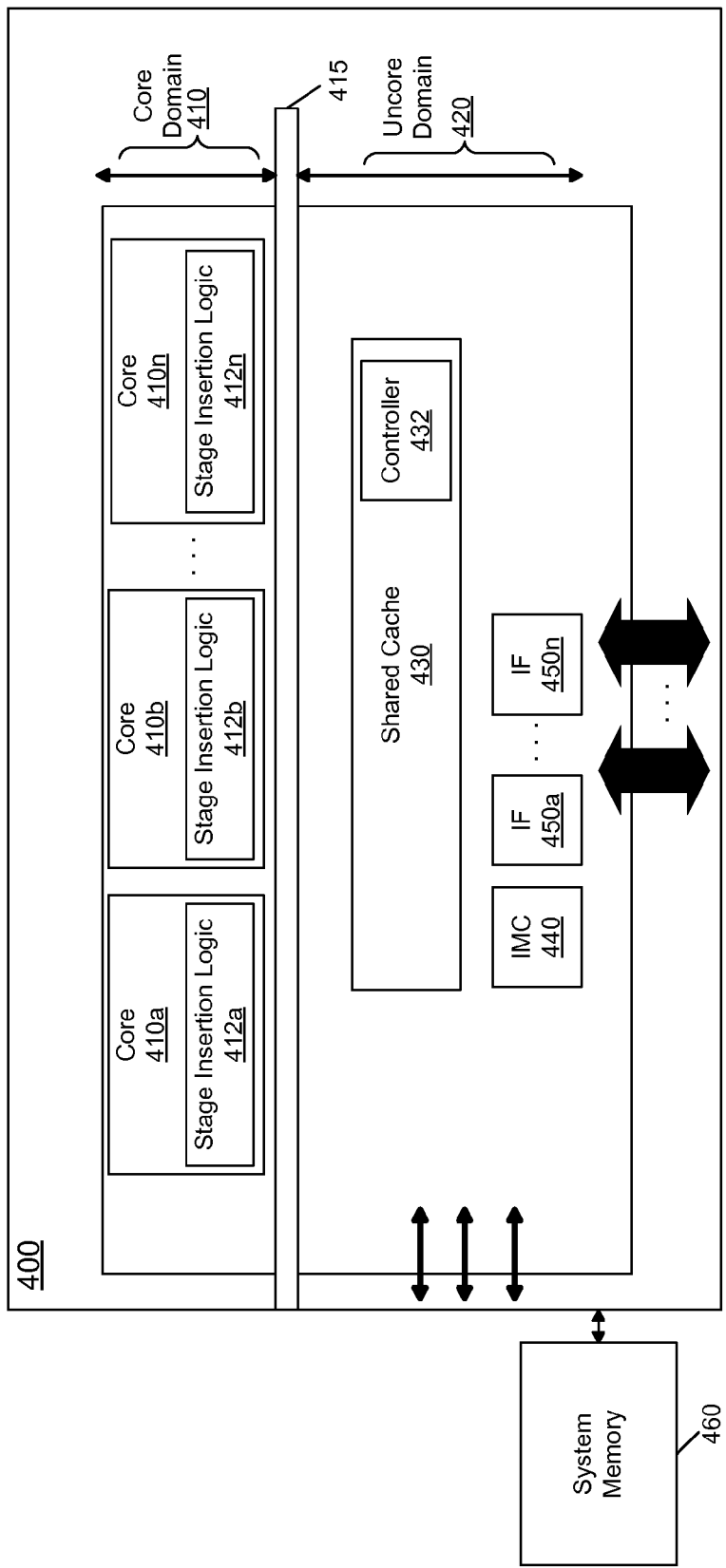
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including a plurality of cores 410a-410n in a core domain 410. One or more of the cores may include stage insertion logic, e.g., 412a, 412b . . . 412n, to add a stage to each iteration of a loop in a pipelined schedule, e.g., to increase efficiency in recovery from an exception, in accordance with embodiments of the present invention. In embodiments of the present invention the stage insertion logic may be implemented as software, firmware, hardware, or a combination thereof.

The cores may be coupled via an interconnect 415 to a system agent or uncore 420 that includes various components. As seen, the uncore 420 may include a shared cache 430 which may be a last level cache and includes a cache controller 432. In addition, the uncore may include an integrated memory controller 440 and various interfaces 450.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
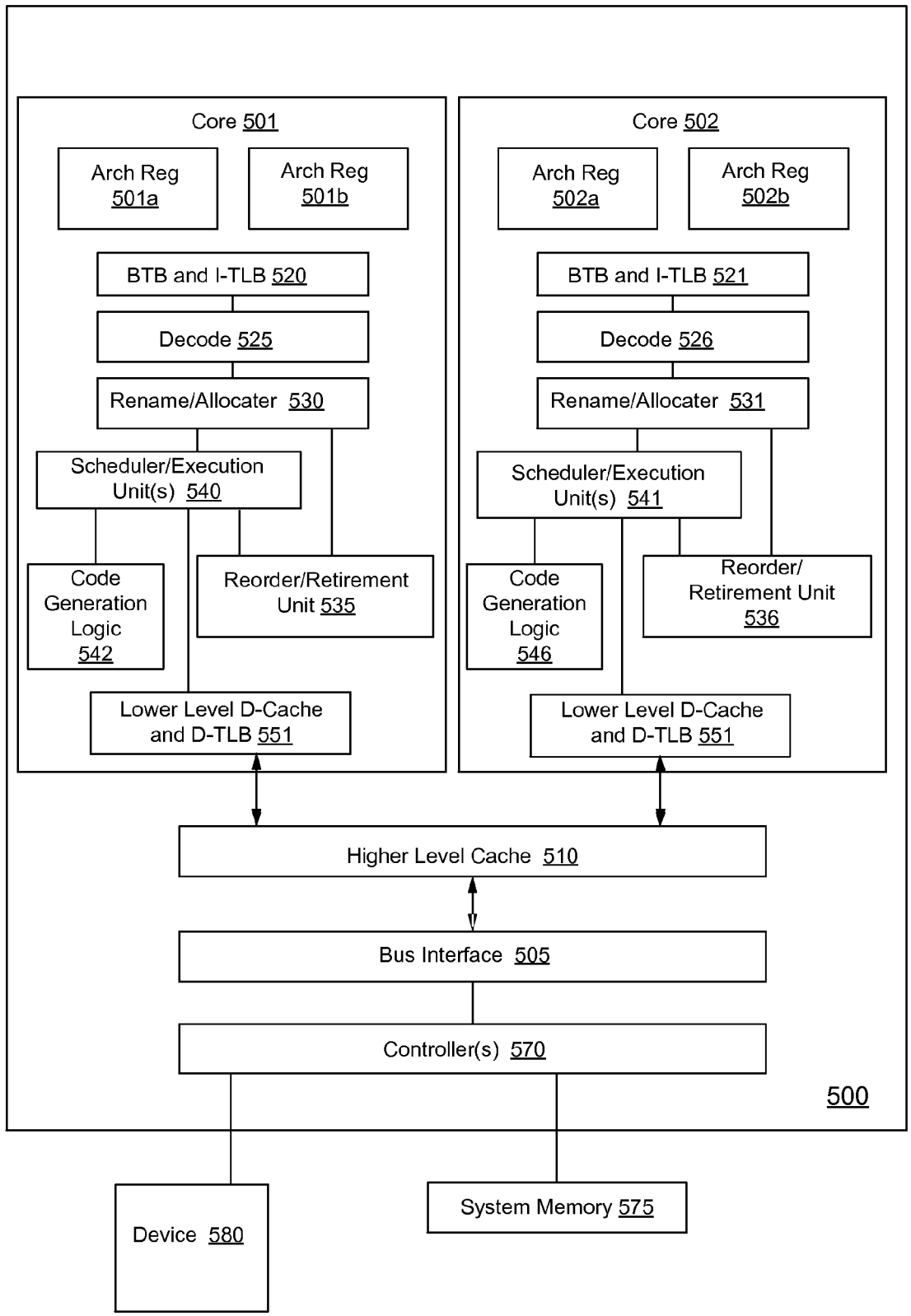
FIG. 5 illustrates an embodiment of a processor including multiple cores, according to an embodiment of the present invention.

Referring to FIG. 5, an embodiment of a processor including multiple cores is illustrated. Processor 500 includes any processor or processing device, such as a microprocessor, an embedded processor, a digital signal processor (DSP), a network processor, a handheld processor, an application processor, a co-processor, a system on a chip (SOC), or other device to execute code. Processor 500, in one embodiment, includes at least two cores—cores 501 and 502, which may include asymmetric cores or symmetric cores (the illustrated embodiment). However, processor 500 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 500, as illustrated in FIG. 5, includes two cores, cores 501 and 502. Here, cores 501 and 502 are considered symmetric cores, i.e., cores with the same configurations, functional units, and/or logic. In another embodiment, core 501 includes an out-of-order processor core, while core 502 includes an in-order processor core. However, cores 501 and 502 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 501 are described in further detail below, as the units in core 502 operate in a similar manner.

As depicted, core 501 includes two hardware threads 501a and 501b, which may also be referred to as hardware thread slots 501a and 501b. Therefore, software entities, such as an operating system, in one embodiment potentially view processor 500 as four separate processors, i.e., four logical processors or processing elements capable of executing four software threads concurrently. As alluded to above, a first thread is associated with architecture state registers 501a, a second thread is associated with architecture state registers 501b, a third thread may be associated with architecture state registers 502a, and a fourth thread may be associated with architecture state registers 502b. Here, each of the architecture state registers (501a, 501b, 502a, and 502b) may be referred to as processing elements, thread slots, or thread units, as described above. As illustrated, architecture state registers 501a are replicated in architecture state registers 501*b*, so individual architecture states/contexts are capable of being stored for logical processor 501*a* and logical processor 501*b*. In core 501, other smaller resources, such as instruction pointers and renaming logic in allocator and renamer block 530 may also be replicated for threads 501*a* and 501*b*. Some resources, such as reorder buffers in reorder/retirement unit 535, ILTB 520, load/store buffers, and queues may be shared through partitioning. Other resources, such as general purpose internal registers, page-table base register(s), low-level data-cache and data-TLB 515, execution unit(s) 540, and portions of out-of-order unit 535 are potentially fully shared.

Processor 500 often includes other resources, which may be fully shared, shared through partitioning, or dedicated by/to processing elements. In FIG. 5, an embodiment of a purely exemplary processor with illustrative logical units/resources of a processor is illustrated. Note that a processor may include, or omit, any of these functional units, as well as include any other known functional units, logic, or firmware not depicted. As illustrated, core 501 includes a simplified, representative out-of-order (OOO) processor core. But an in-order processor may be utilized in different embodiments. The OOO core includes a branch target buffer 520 to predict branches to be executed/taken and an instruction-translation buffer (I-TLB) 520 to store address translation entries for instructions.

Core 501 further includes decode module 525 coupled to fetch unit 520 to decode fetched elements. Fetch logic, in one embodiment, includes individual sequencers associated with thread slots 501*a*, 501*b*, respectively. Usually core 501 is associated with a first ISA, which defines/specifies instructions executable on processor 500. Often machine code instructions that are part of the first ISA include a portion of the instruction (referred to as an opcode), which references/specifies an instruction or operation to be performed. Decode logic 525 includes circuitry that recognizes these instructions from their opcodes and passes the decoded instructions on in the pipeline for processing as defined by the first ISA. For example, decoders 525, in one embodiment, include logic designed or adapted to recognize specific instructions, such as transactional instruction. As a result of the recognition by decoders 525, the architecture or core 501 takes specific, predefined actions to perform tasks associated with the appropriate instruction. It is important to note that any of the tasks, blocks, operations, and methods described herein may be performed in response to a single or multiple instructions, some of which may be new or old instructions.

In one example, allocator and renamer block 530 includes an allocator to reserve resources, such as register files to store instruction processing results. However, threads 501*a* and 501*b* are potentially capable of out-of-order execution, where allocator and renamer block 530 also reserves other resources, such as reorder buffers to track instruction results. Unit 530 may also include a register renamer to rename program/instruction reference registers to other registers internal to processor 500. Reorder/retirement unit 535 includes components, such as the reorder buffers mentioned above, load buffers, and store buffers, to support out-of-order execution and later in-order retirement of instructions executed out-of-order.

Scheduler and execution unit(s) block 540, in one embodiment, includes a scheduler unit to schedule instructions/operation on execution units. For example, the scheduler unit may schedule operations of a loop according to a pipelined schedule. Register files associated with the execution units are also included to store information instruction processing results. Exemplary execution units include a floating point execution unit, an integer execution unit, a jump execution unit, a load execution unit, a store execution unit, and other known execution units.

One or both of cores 501 and 502 may include code generation logic (542, 546, respectively) to insert an additional stage into each iteration of the pipeline scheduled loop, in accordance with embodiments of the present invention. The code generation logic (542, 546) may also rename one or more registers to which a variable of a loop iteration has been assigned, in accordance with embodiments of the present invention.

Lower level data cache and data translation buffer (D-TLB) 551 are coupled to execution unit(s) 540. The D-TLB 551 is to store recent virtual/linear to physical address translations. As a specific example, a processor may include a page table structure to break physical memory into a plurality of virtual pages.

Here, cores 501 and 502 share access to higher-level or further-out cache 510, which is to cache recently fetched elements. Note that higher-level or further-out refers to cache levels increasing or getting further away from the execution unit(s). In one embodiment, higher-level cache 510 is a last-level data cache—last cache in the memory hierarchy on processor 500—such as a second or third level data cache. However, higher level cache 510 is not so limited, as it may be associated with or includes an instruction cache. A trace cache—a type of instruction cache—instead may be coupled after decoder 525 to store recently decoded traces.

In the depicted configuration, processor 500 also includes bus interface module 505. Historically, controller 570 has been included in a computing system external to processor 500. In this scenario, bus interface 505 is to communicate with devices external to processor 500, such as system memory 575, a chipset (often including a memory controller hub to connect to memory 575 and an I/O controller hub to connect peripheral devices), a memory controller hub, a northbridge, or other integrated circuit. And in this scenario, bus 505 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 575 may be dedicated to processor 500 or shared with other devices in a system. Common examples of types of memory 575 include DRAM, SRAM, non-volatile memory (NV memory), and other known storage devices. Note that device 580 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 570 is illustrated as part of processor 500. Recently, as more logic and devices are being integrated on a single die, such as SOC, each of these devices may be incorporated on processor 500. For example in one embodiment, memory controller hub 570 is on the same package and/or die with processor 500. Here, a portion of the core (an on-core portion) includes one or more controller(s) 570 for interfacing with other devices such as memory 575 or a graphics device 580. The configuration including an interconnect and controllers for interfacing with such devices is often referred to as an on-core (or un-core configuration). As an example, bus interface 505 includes a ring interconnect with a memory controller for interfacing with memory 575 and a graphics controller for interfacing with graphics device 580. Yet, in the SOC environment, even more devices, such as the network interface, co-processors, memory 575, graphics device 580, and any other known computer devices/interface may be integrated on a single die or integrated circuit to provide small form factor with high functionality and low power consumption.

Figure 6:
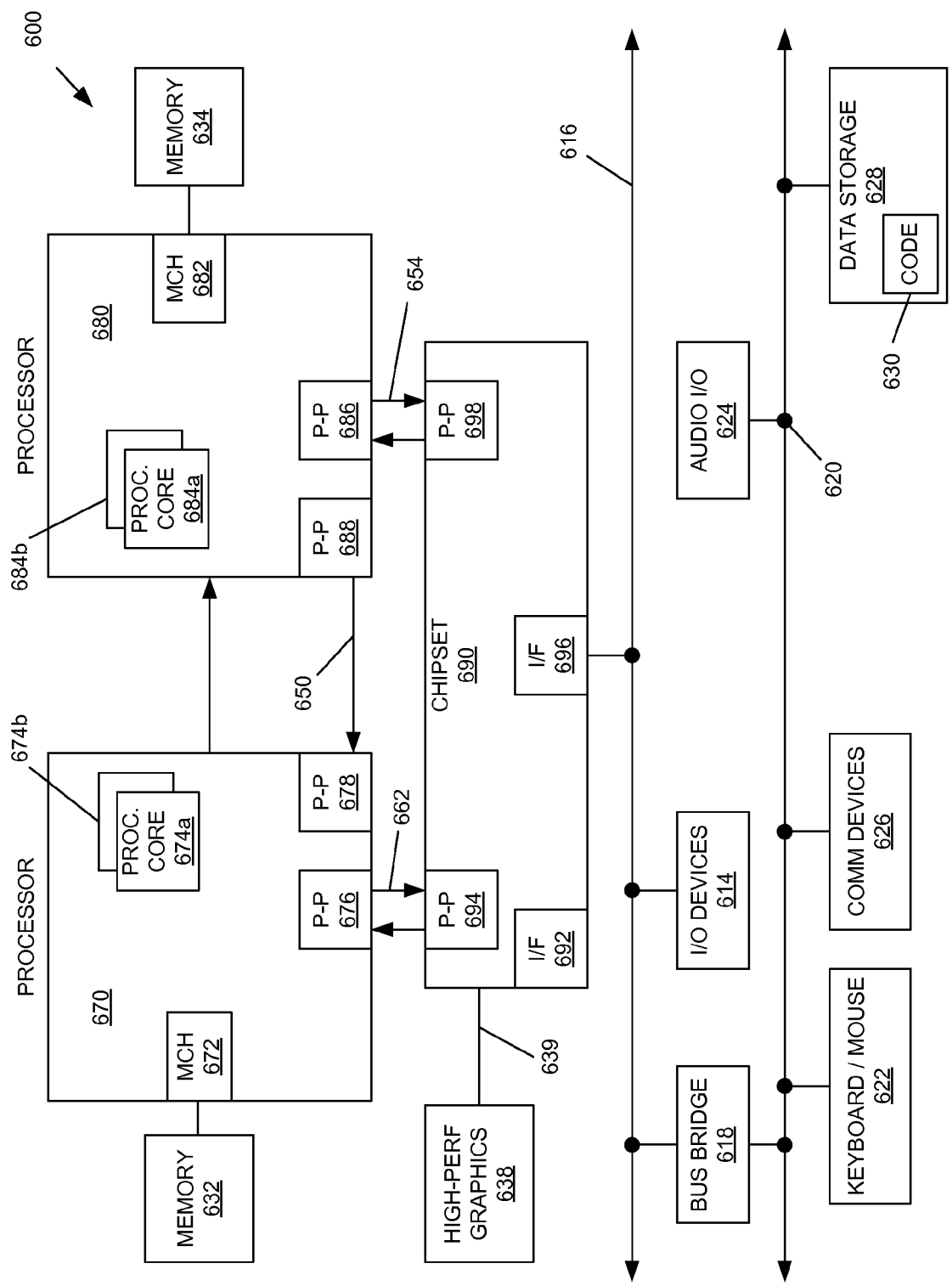
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. Each of the processors 670 and 680 may include stage insertion logic (not shown) to insert an additional stage into each iteration of a pipeline scheduled loop, in accordance with embodiments of the present invention, and may also include modulo variable expansion logic to rename registers associated with each iteration of the pipeline scheduled loop, according to embodiments of the present invention. The additional stage may enable more efficient recovery from an exception than discarding all results of the loop. The more efficient recovery may be due at least in part to an increased lifetime of a live out variable (e.g., variable having a value generated inside a loop that is used outside of the loop), according to embodiments of the present invention. The processors may also include compensation logic to recover a value stored in a renamed register, and to complete store operations, in accordance with embodiments of the present invention. First processor 670 and second processor 680 may be coupled to a chipset 690 via P-P interconnects 662 and 654, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, Ultrabook™, tablet computer, netbook, and so forth.

The following examples pertain to further embodiments.

In a first example, a system includes a processor including at least one core to execute operations of a loop and stage insertion means for adding a delay stage to the loop to increase a lifetime of a register associated with a first variable of the loop and to delay storage of contents of the register. The system also includes a dynamic random access memory (DRAM). The processor optionally includes modulo variable expansion logic for renaming the register to a second register.

The modulo variable expansion logic may also rename the register in each iteration of a plurality of iterations of the loop, from the register to a respective different register. The processor optionally includes compensation logic to re-execute a store operation of an $(N-S+M)^{th}$ iteration of the loop responsive to an exception in an $M^{th}$ stage of an $N^{th}$ iteration of the loop, where each iteration of the loop includes S stages. The compensation logic may recover a live-out value of the register in the $(N-S+M)^{th}$ iteration of the loop responsive to the exception. The processor optionally includes handler logic to handle the exception prior to re-execution of the store operation and recovery of the live-out value of the register. The processor optionally resumes execution of the loop starting from the $(N-S+M+1)^{th}$ iteration responsive to the exception. The processor optionally commits results of a most recently completed iteration of the loop responsive to an exception in a current iteration that is being executed.

In a second example, at least one computer readable medium includes instructions that when executed enable a system to receive a pipelined schedule of a loop that includes a plurality of iterations to be executed in parallel according to the pipelined schedule. Each iteration of the loop may include a respective assignment operation to assign a respective value of a variable to a register, and a respective store operation to store a value determined in the iteration to a memory. The instructions, when executed, may enable the system to insert a delay stage into each iteration of the pipelined schedule to delay execution of the respective store operation and to increase a respective lifetime of the register in each iteration. The at least one computer readable medium may optionally include modulo variable expansion instructions to replace a first register having a first register name, to which a value of the variable of a first iteration of the loop is assigned, with a second register having a second register name. The at least one computer readable medium may optionally include instructions to replace, in each iteration of a plurality of iterations, the first register having the first register name to a corresponding different register having a corresponding different register name. The at least one computer readable medium may optionally include instructions to re-execute a first store operation of an $(N-S+M)^{th}$ iteration of the loop responsive to an exception in an $M^{th}$ stage of the $N^{th}$ iteration of the loop, where each iteration of the loop includes S stages. The at least one computer readable medium may optionally include instructions to recover a live-out value of a first register associated with the $(N-S+M)^{th}$ iteration responsive to the exception in the $N^{th}$ iteration of the loop. The at least one computer readable medium may optionally include instructions to handle the exception prior to recovery of the live-out value of the first register. The at least one computer readable medium may optionally include instructions to commit results of a most recently completed iteration of the loop responsive to an exception in a current iteration that is being executed.

In a third example, a method includes receiving a pipelined schedule of a loop that comprises a plurality of iterations to be executed in parallel according to the pipelined schedule. Each iteration includes an assignment operation to assign a value of a variable associated with the iteration to a register, and a respective store operation to store contents of the register to a memory. The method also includes inserting a delay stage into each iteration of the pipelined schedule to delay execution of the respective store operation and to increase a lifetime of the register in the respective iteration. The method may optionally include replacing the register associated with the variable in a first iteration from a first register name to a first replacement register, and reassigning the replacement register to the variable in a subsequent iteration of the loop. The method may optionally include in response to an exception that occurs in a particular iteration, committing results of a most recently completed iteration of the loop. The method optionally also include, in response to an exception that occurs in a particular iteration, handling the exception via execution of handler code. The method may optionally include committing results of a most recently completed iteration of the loop and resuming execution of the loop starting from the most recently completed iteration.

In a fourth example, a processor to execute a loop includes at least one core to execute operations of a loop, and stage insertion logic to add a delay stage to the loop to increase a lifetime of a register associated with a first variable of a first iteration of the loop and to delay storage of contents of the register. The processor may optionally include renaming logic to rename the register to a second register, or to rename the register in each iteration of a plurality of iterations of the loop, from the register to a respective different register. The processor may optionally include compensation logic to re-execute a store operation of an $(N-S+M)^{th}$ iteration of the loop responsive to an exception in an $M^{th}$ stage of an $N^{th}$ iteration of the loop, where each iteration includes S stages. The processor may optionally include handler logic for handling the exception prior to the compensation logic re-executing the store operation. The compensation logic may optionally recover a live-out value of a first register associated with the $(N-S+M)^{th}$ iteration of the loop responsive to the exception in the $N^{th}$ iteration of the loop. The processor may resume execution of the loop starting from the most recently completed iteration responsive to the exception. Optionally, the processor may commit results of a most recently completed iteration of the loop responsive to an exception in a current iteration that is being executed.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a processor including:
at least one core to receive a pipelined schedule of a loop that comprises a plurality of iterations to be executed in parallel according to the pipelined schedule, wherein each iteration of the loop includes a respective assignment operation to assign a respective value of a variable to a register and a respective store operation to store a value determined in the iteration to a memory;
stage insertion logic to add a delay stage into each iteration of the pipelined schedule to delay execution of the respective store operation and to increase a respective lifetime of the register in each iteration; and
modulo variable expansion logic to replace use of the register having a first register name to which a value of the variable of a first iteration of the loop is assigned, with a second register having a second register name; and
a dynamic random access memory (DRAM).

2. The system of claim 1, wherein the modulo variable expansion logic is further to rename the register in each iteration of a plurality of iterations of the loop, from the register to a respective different register.

3. The system of claim 1, wherein the processor further comprises compensation logic to re-execute a store operation of an $(N-S+M)$ iteration of the loop responsive to an exception in an $M^{th}$ stage of an $N^{th}$ iteration of the loop, wherein each iteration of the loop comprises S stages.

4. The system of claim 3, wherein the compensation logic is further to recover a live-out value of the register in the $(N-S+M)$ iteration of the loop responsive to the exception.

5. The system of claim 4, wherein the processor further comprises handler logic to handle the exception prior to re-execution of the store operation and recovery of the live-out value of the register.

6. The system of claim 5, wherein the processor is further to resume execution of the loop starting from the $(N-S+M+1)^{th}$ iteration responsive to the exception.

7. The system of claim 1, wherein the processor is to commit results of a most recently completed iteration of the loop responsive to an exception in a current iteration that is being executed.

8. At least one non-transitory computer readable medium including instructions that when executed enable a system to:
receive a pipelined schedule of a loop that comprises a plurality of iterations to be executed in parallel according to the pipelined schedule, wherein each iteration of the loop includes a respective assignment operation to assign a respective value of a variable to a register and a respective store operation to store a value determined in the iteration to a memory;
insert a delay stage into each iteration of the pipelined schedule to delay execution of the respective store operation and to increase a respective lifetime of the register in each iteration; and
replace use of the register having a first register name to which a value of the variable of a first iteration of the loop is assigned, with a second register having a second register name.

9. The at least one computer readable medium of claim 8, further including instructions to replace, in each iteration of the plurality of iterations, use of the register by use of a corresponding different register that differs from the register and that has a corresponding different register name.

10. The at least one computer readable medium of claim 8, further including instructions to re-execute a first store operation of an $(N-S+M)^{th}$ iteration of the loop responsive to an exception in an $M^{th}$ stage of the $N^{th}$ iteration of the loop, wherein each iteration of the loop includes S stages.

11. The at least one computer readable medium of claim 10, further including instructions to recover a live-out value of a first register associated with the $(N-S+M)^{th}$ iteration responsive to the exception in the $N^{th}$ iteration of the loop.

12. The at least one computer readable medium of claim 11, further including instructions to handle the exception prior to recovery of the live-out value of the first register.

13. The at least one computer readable medium of claim 8, further including instructions is to commit results of a most recently completed iteration of the loop responsive to an exception in a current iteration that is being executed.

14. A method comprising:
   receiving a pipelined schedule of a loop that comprises a plurality of iterations to be executed in parallel according to the pipelined schedule, each iteration of the loop including a respective assignment operation to assign a respective value of a variable associated with the iteration to a register, and a respective store operation to store contents of the register to a memory;
   inserting a delay stage into each iteration of the pipelined schedule to delay execution of the respective store operation and to increase a respective lifetime of the register in each iteration; and
   for each iteration of the plurality of iterations, assigning the value of the variable to a corresponding replacement register and replacing use of the register by the corresponding replacement register.

15. The method of claim 14, further comprising in response to an exception that occurs in a particular iteration, handling the exception via execution of handler code.

16. The method of claim 15, further comprising committing results of a most recently completed iteration of the loop.

17. The method of claim 14, further comprising, in response to an exception in a particular iteration, committing results of a most recently completed iteration of the loop.

* * * * *